3,403,136
CARBOXYLIC ELASTOMERS
John C. Baker, Jr., Dover, Del., assignor to Standard Brands Chemical Industries, Inc., Dover, Del., a corporation of Delaware
No Drawing. Filed Sept. 6, 1963, Ser. No. 307,011
11 Claims. (Cl. 260—79.5)

ABSTRACT OF THE DISCLOSURE

A carboxylic rubber mix capable of being cured by heating comprising a carboxylic rubbery copolymer and a curing system for preventing precure of said copolymer, said system containing a polyvalent metal curing agent reactable with carboxyl groups of the copolymer, at least about one-fourth of which is present as a peroxide.

The present invention relates to the curing or vulcanization of synthetic rubber compositions, and provides elastic carboxylic polymers having improved cured rubber properties. More particularly, my invention relates to a system for curing polymers having reactive carboxyl groups so that the tendency of such polymers to precure is overcome. At the same time, the invention provides improvement in compression set and ozone resistance of the cured carboxylic rubber and maintains a high level of other vulcanizate properties.

Polymers containing carboxyl (—COOH) groups pendant from the polymer chain are polar elastomers characterized by good tensile strength and modulus in the pure gum vulcanizate (unreinforced) state. The carboxyl groups provide sites for cross-linking reactions which cure the polymer and transform it from a plastic to an elastic state. Carboxylic polymers thus possess a means for curing which is not dependent upon the classical sulfur cure or the less common organic peroxide cure systems used for most synthetic rubbers derived from diolefins. Curing of the plastic carboxylic polymers is readily accomplished by reaction of polyvalent metal oxides, hydroxides or weak acid salts with the carboxyl groups in different polymer chains to form elastic metallo-carboxylate rubber polymers. Such carboxylic polymers and the elastic metallo-carboxylate polymers resulting from such cross-linking reactions are described in U.S. Patent 2,662,874 to Brown dated Dec. 15, 1953. Carboxylic polymers prepared from diolefins may be cured with metal oxide only, or the metallo-carboxylate cure may be used in conjunction with a conventional sulfur vulcanization as described in the literature "Carboxylic Elastomers," Industrial and Engineering Chemistry, vol. 47, #5, pp. 1006 to 1012.

The salt-forming reaction of the carboxylic polymers with polyvalent metals is an ionic type reaction and has a much faster rate than the vulcanization rate with typical sulfur cure systems. This rapid ionic reaction presents a problem because the polymer tends to precure or "scorch" when the polyvalent metal curing agent is incorporated into the rubber stock. With carboxylic rubber the precure problem exists even at room temperature whereas with non-carboxylic rubber stocks scorch generally is not a problem until the rubber mix is heated in processing. Precure or "scorch" is defined as premature vulcanization, that is, the stock becomes partly vulcanized after mixing with the curing system and before it is ready to be vulcanized. Such precure or "scorch" toughens the rubber and makes it less plastic so that it can no longer be processed or fabricated. Precure or scorch results in scrapped stock or defective products. Thus, carboxylic rubber provides many advantages, but presents a serious or critical precure problem.

I have discovered a curing system for carboxylic rubbery polymers which not only obviates this precure tendency, but also provides improved compression set and ozone resistance in the cured rubber. At the same time the curing system of the invention maintains other vulcanizate properties at desirably high levels.

I have found that supplying a part or all of the polyvalent metal cross-linking agent in the form of peroxide retards the salt-forming metallo-carboxylate reaction and overcomes the tendency of the rubbery polymer to precure or scorch. This improved result and the improvements in cured rubber properties above-mentioned are obtained whether the carboxylic polymer is compounded with a cure system consisting only of the polyvalent metal or also containing sulfur or other curing agents, such as organic peroxides.

Advantageously, the peroxide is added to the rubber mix as a part or all of the polyvalent metal curing agent and not as a separate and additional component of the rubber batch. In practice, it is preferred to use a mixture of polyvalent metal oxide and peroxide, since commercially available peroxides are often supplied that way. Any of the polyvalent metal oxides or hydroxides (hydrated oxides) set forth in the above-mentioned U.S. Patent 2,662,874 are suitable as cross-linking agents in the present invention, provided they are used with a peroxide of the same and/or different metal. If the particular polyvalent metal selected does not form a peroxide, then the peroxide of a different polyvalent metal may be used in admixture with the oxide of the other metal. Mixtures of polyvalent metals and their oxides and peroxides provide good results. The peroxides and oxides of metals of Group II of the Periodic Table, and in particular zinc, calcium and magnesium are preferred because of the excellent physical properties developed in the rubber and because of their availability. Zinc peroxide has an advantage when a sulfur cure is used in that it functions as an activator for the accelerator in the sulfur cure system, and also supplies the polyvalent metal for the metallo-carboxylate cross-linking reaction.

It may be characterized as unexpected that the improved results of the invention are obtained with the peroxide present in only minor amount relative to the total amount of polyvalent metal used for the metallo-carboxylate curing reaction. For example, as little as one half part of peroxide per hundred of rubber are effective based on a total polyvalent metal compound charged of one or two parts per hundred of rubber. On the other hand, as stated above a major portion of the polyvalent metal may be in peroxide form, or all of it if the peroxide is available and is sufficiently stable in pure form. Preferably the metal peroxide should not decompose appreciably until subjected to curing temperatures. Advantageously, the invention provides a control over the rate of the curing reaction by using mixtures of oxides and peroxides and varying the proportions or by selecting polyvalent metals whose peroxides decompose at different temperatures.

The total quantity of polyvalent metal incorporated in the rubber mix for the curing reactions will generally be not less than about one-half of the stiochiometric or theoretical amount based on the carboxyl equivalents in the polymer (expressed as equivalents per hundred parts of rubber—ephr.) and amounts not substantially exceeding twice theoretical are advantageous in developing optimum cured rubber properties. In general the carboxyl content of the polymer may vary from as little as about 0.02 ephr. to about 0.5 ephr., or from about 1% to 40% acid by weight.

It is to be understood, however, that the invention embraces cure systems in which typical sulfur vulcanization recipes containing zinc oxide as an activator are used. In such case the zinc oxide may be charged in conventional amounts e.g. 2–5 parts per hundred of rubber as an activator for the sulfur cure accelerator and will also supply the polyvalent metal for the metallo-carboxylate cross-linking reaction. Consequently, the invention is not limited to a polyvalent metal charge based on the stoichiometry of the reaction of the polyvalent metal with the carboxyl groups in the polymer.

As above stated, in the production of vulcanized rubber products, it is necessary to avoid premature vulcanization of the rubber when mixed with the curing ingredients. Even partial precuring or "scorch" during mixing and processing must be avoided to allow the rubber mix to be worked properly on the mill, to be calendered into sheet, or to be shaped in molding, before it is cured or vulcanized.

The standard test used in the industry for determining the precure or scorch tendency of a rubber mix is referred to as the "Mooney Scorch Test" which utilizes a Mooney Shearing Disc Viscometer. The test is essentially a measurement of viscosity increase due to cross-linking of polymer chains which is the basic mechanism of vulcanization. Premature vulcanization occurring in the rubber mix is evidenced by an increase in Mooney viscosity of the rubber stock. In the test a shear is exerted on a rubber sample with a small rotor having a disc of $1\frac{1}{16}$ inch in diameter, with the sample heated to a temperature of 250° F. Increase in shear strength or viscosity is indicated by the difference in deflection of a dial gauge, the deflection of which is proportional to the true mean viscosity of the sample. The tendency to scorch is reported as the Mooney Scorch in minutes. This is the measured time required for a selected increase in deflection of the dial due to increase in viscosity of the sample. In the tests reported herein, the Mooney Scorch time is reported in minutes for a five (5) point increase in deflection, and in some instances also for a twenty or thirty point increase in deflection. The Mooney Scorch is measured within four hours after mixing the curatives into the polymer, and also after seven (7) days aging at room temperature in order to provide an indication of bin storage stability or shelf life of the mix.

The invention is more specifically described below in conjunction with the examples and test data which illustrate many variations in the practice of the invention and the results obtained.

The rubbery carboxylated polymers for the tests set forth below were prepared by aqueous emulsion polymerization of the selected monomers to give the desired synthetic rubbery carboxylic polymer followed by coagulation of the latex and drying of the polymer. The polyvalent metal oxide and/or peroxide cross-linking agent is incorporated by mill mixing or in other suitable mixer, e.g. Banbury. Other curatives and reinforcing agents indicated as used in the examples given below are incorporated in like manner or by known masterbatching methods, or other methods conventional in rubber production which are carried out on ordinary rubber mill equipment.

The physical properties developed in the cured rubber are reported in the tests tabulated below, including compression set and ozone resistance (Table X) properties which are improved by the use of peroxide in the cure systems for the carboxylic polymers. It is well known that carboxylic rubbers cured without sulfur or organic peroxide, that is, only by metallocarboxylate cross-linking reaction have relatively high compression set values. As shown in the tests set forth below the present invention accomplishes significant improvement in compression set not only with sulfur cured stocks, but also where the carboxylic polymer is cured only with polyvalent metal.

The following example typifies the preparation by aqueous emulsion polymerization of carboxylic polymers to which the invention pertains and will not be repeated for each polymer, since their synthesis is not a part of this invention. The test data on these polymers set forth in the Tables below provide numerous complete specific embodiments of the invention and illustrate but do not limit its scope.

Example

A monomer mixture of 59 parts butadine, 32 parts acrylonitrile and 9 parts methacrylic acid was subjected to the emulsion polymerization in 125 parts of water using 4 parts of a sodium alkylaryl sulfonate as an anionic emulsifying agent, 0.02 part of potassium persulfate as initiator, 0.02 part of a chelating agent, ethylenediaminetetraacidic acid, and 0.5 part of a modifier consisting of mixed tertiary $C_{12}$ to $C_{16}$ mercaptans. The reaction was conducted at 50° C. and was terminated by addition of 0.5 part hydroquinone as shortstop after approximately 75% monomer conversion. 1 part of a stabilizer, phenyl beta naphthylamine, was added to the finished latex, which was then coagulated by addition of sodium chloride with addition of ethyl alcohol. The coagulated latex was well washed and then dried to a crumb in an air oven. The resulting plastic polymer had a carboxyl content of approximately 0.09 ephr. In the tables below the carboxyl content of the polymers is expressed as equivalents per hundred of rubber, that is, ephr. —COOH.

The carboxylated polymers prepared as above exemplified were mixed with the recipes given in the tables set forth below, and the Mooney Scorch test was run on the uncured stocks. In all of the test data set forth below parts are given as parts per hundred of rubber, except where otherwise indicated.

TABLE I

| Recipe | A | B | C | D | E | F | G |
|---|---|---|---|---|---|---|---|
| Carboxylic rubber [1] | 100 | 100 | 100 | 100 | 100 | 100 | 100 |
| SRF Black (Furnex) | 40 | 40 | 40 | 40 | 40 | 40 | 40 |
| Dibutyl Phthalate | 5 | 5 | 5 | 5 | 5 | 5 | 5 |
| Sulfur | 1.5 | 1.5 | | | | | |
| Stearic Acid | 1 | 1 | | | | | |
| Altax—benzothiazyl disulfide | 1 | 1 | | | | | |
| ZnO #20 [2] | 5 | | | | | | |
| Zinc Peroxide [3] | | 6 | | | | 5 | 5 |
| ZnO #20–21 [4] | | | 5 | 10 | | | |
| Ca(OH)₂ | | | | | 10 | | |
| Calcium Peroxide [5] | | | | | | 5 | |
| Magnesium Peroxide [6] | | | | | | | 5 |

MOONEY SCORCH AT 250° F.

| Within 4 hours of mixing: | | | | | | | |
|---|---|---|---|---|---|---|---|
| 5 point rise | 27 | (⁷) | 26 | 19 | 4 | (⁷) | (⁷) |
| Lowest reading | 18 | 7 | 19 | 19 | 25 | 12 | 10 |

TABLE I—Continued
CURED PROPERTIES

|  | Cure, Minutes at °F. | | | | | | |
|---|---|---|---|---|---|---|---|
|  | 20' at 307° F. | 30' at 307° F. | 20' at 307° F. | 20' at 307° F. | 20' at 307° F. | 30' at 325° F. | 30' at 325° F. |
| Tensile, p.s.i | 3,890 | 2,920 | 2,020 | 3,740 | 3,840 | 3,840 | 3,620 |
| Elongation, percent | 410 | 460 | 510 | 460 | 420 | 220 | 310 |
| Hardness Shore "A" | 86 | 78 | 79 | 87 | 93 | 92 | 89 |
| Modulus 300%, p.s.i | 3,210 | 2,250 | 1,300 | 3,095 | 3,310 |  | 3,567 |

|  | Cure, Minutes at °F. | | | | | | |
|---|---|---|---|---|---|---|---|
|  | 30' at 307° F. | 40' at 307° F. | 60' at 200° F. | 60' at 200° F. | 60' at 200° F. | 60' at 325° F. | 60' at 325° F. |
| Tensile, p.s.i | 3,580 | 3,330 | 300+ | 290+ | 3,250 | 4,240 | 3,946 |
| Elongation, percent | 300 | 430 | 1,300+ | 1,300+ | 430 | 225 | 280 |
| Hardness Shore "A" | 87 | 78 | 66 | 66 | 92 | 92 | 91 |
| Modulus 300%, p.s.i | 3,580 | 2,670 | 152 | 195 | 2,720 |  |  |

[1] A butadiene/acrylonitrile/methacrylic acid polymer from a 59/32/9 monomer charge ratio with about 0.09 ephr. COOH.
[2] Rubber grade.
[3] 55% $ZnO_2$, balance ZnO and $Zn(OH)_2$.
[4] Same as ZnO #20 but coated with hydrophobic high molecular weight organic material.
[5] 60% $CaO_2$, balance CaO and $Ca(OH)_2$.
[6] 50% $MgO_2$, balance MgO and $Mg(OH)_2$.
[7] No rise in 30 minutes.

Recipes C, D, E, F and G show the effect of peroxide where the carboxylic rubber contains only polyvalent metal as curing agent, while recipes A and B show the effect where a sulfur cure is also used. The substantially equal Mooney scorch values of stocks A and C show that the precure tendency of these rubber mixes is due to the rapid ionic cross-linking reaction of the polyvalent metal oxide and the carboxyl groups to form the metallo-carboxylate, and the precure tendency is not materially influenced by the sulfur cure system when present. Stock E shows a very pronounced precure, it being known that calcium gives a faster carboxylate cure than zinc.

The presence of peroxide in the B, F and G stocks controls the reaction rate and eliminates the tendency to precure as shown by the fact that there is no discernable rise in Mooney Scorch in 30 minutes. In addition, the lower initial Mooney viscosities "Lowest Reading" values of the peroxide-containing stocks show that there is less cross-linking in the polymers at the time of testing. The tensile values developed in the cured peroxide-containing stocks are directly comparable to those obtained in the zinc oxide and calcium hydroxide recipes of stocks A, C, D and E, when the cure cycle, i.e. time and temperature is sufficient to develop adequately the tensile and other physical properties. For example, with a higher charge of the rapid curing calcium hydroxide, 60 minutes at 200° F. was adequate, but a higher temperature was required to develop the tensiles in stocks B, C and D cured with the zinc peroxide-oxide blend or with zinc oxide.

Stocks F and G also demonstrate that mixed peroxides of different metals are effective, as well as zinc peroxide.

In the tests shown in Table II, a commercial carboxylated nitrile rubber, Hycar 1072-A and a butadiene/acrylonitrile/methacrylic acid copolymer containing approximately 0.09 ephr. of carboxyl (—COOH) were tested in a sulfur cure recipe with and without zinc peroxide.

TABLE II

| Recipe | A | B | C | D | E |
|---|---|---|---|---|---|
| Nitrile Rubber with 0.09 ephr. COOH |  |  | 100 | 100 | 100 |
| Hycar 1072 (about 0.1 ephr. COOH) | 100 | 100 |  |  |  |
| SRF Black (Furnex) | 40 | 40 | 40 | 40 | 40 |
| Dibutyl Phthalate | 5 | 5 | 5 | 5 | 5 |
| Sulfur | 1.5 | 1.5 | 1.5 | 1.5 | 1.5 |
| Stearic Acid | 1 | 1 | 1 | 1 | 1 |
| Altax | 1 | 1 | 1 | 1 | 1 |
| ZnO #20 | 5 |  | 5 |  |  |
| AnO #20-21 [1] |  |  |  | 5 |  |
| Zinc Peroxide (55%) |  | 5 |  |  | 5 |

Mooney Scorch at 250° F.

| Within 4 hours of Mixing: |  |  |  |  |  |
|---|---|---|---|---|---|
| 5 point rise | 29 | 50 | 19 | 19 | 42 |
| Lowest reading | 19 | 19 | 20 | 21 | 20 |
| After 7 Days Bin Storage: |  |  |  |  |  |
| 5 point rise | 23 | 43 | 17 | 15 | 37 |
| Lowest reading | 19 | 17 | 21 | 21 | 19 |

TABLE II—Continued
Cured Properties

|  | Cure, Min./° F. | | | | |
|---|---|---|---|---|---|
|  | 30/307 | 60/325 | 30/307 | 30/307 | 60/325 |
| Tensile, p.s.i | 3,790 | 3,310 | 3,750 | 3,690 | 3,490 |
| Elongation, percent | 440 | 340 | 370 | 360 | 310 |
| Hardness Shore "A" | 82 | 82 | 85 | 85 | 85 |
| Modulus 300%, p.s.i | 2,700 | 2,960 | 3,340 | 3,270 | 3,400 |

Air Oven Aged—70 Hours at 212° F.

|  | Cure, Min./° F. | | | | |
|---|---|---|---|---|---|
|  | 30/307 | 60/325 | 20/307 | 20/307 | 60/325 |
| Tensile, p.s.i | 3,900 | 3,580 | 4,000 | 3,840 | 3,690 |
| Elongation, percent [2] | 270(39) | 230(32) | 230(38) | 230(36) | 200(36) |
| Hardness Shore "A" | 86 | 87 | 88 | 90 | 90 |

Compression Set—Method "B"—Aged 70 Hours at 212° F.

|  | Cure, Min./° F. | | | | |
|---|---|---|---|---|---|
|  | 45/307 | 60/325 | 45/307 | 45/307 | 69/325 |
| Percent Set | 53.3 | 31.6 | 48.5 | 45.3 | 28.7 |

[1] Same as ZnO #20 but coated with hydrophobic high molecular weight organic material.
[2] Values in parentheses are percent loss in elongation on aging.

Here again the data of Table II shows the advantages of zinc peroxide over zinc oxide. A considerable safety factor is afforded the mixed stock when $ZnO_2$ is used as shown by the Mooney Scorch values with only slight reduciton in ultimate tensile strength for both unaged and aged stocks. The $ZnO_2$ cured compounds also have a slight advantage over the ZnO cures on the basis of percent loss in elongation on aging. A very pronounced advantage in the peroxide cured stocks is the marked reduction in compression set compared to the zinc-oxide compounded stocks.

Tables III to VI, inclusive show the applicability of the invention to a variety of carboxylic polymers, filler loadings, accelerators and cure systems.

TABLE III

| Receipe | A | B |
|---|---|---|
| Carboxylic Rubber [1] | 100 | 100 |
| Furnex (SRF Black) | 40 | 40 |
| Dibutyl Phthalate | 5 | 5 |
| Stearic Acid | 1 | 1 |
| Sulfur | 1.5 | 1.5 |
| Altax | 1 | 1 |
| $ZnO_2$ (55%) | 5 |  |
| ZnO #20 |  | 5 |

Mooney Scorch at 250° F.

| Within 4 hours after mixing: |  |  |
|---|---|---|
| 5 point rise | 32 | 18 |
| Lowest reading | 13 | 15 |
| After 7 days bin aging at room temp.: |  |  |
| 5 point rise | 32 | 14 |
| Lowest reading | 13 | 16 |

Unaged Cured Properties—Cure 40' at 325° F.

| Tensile, p.s.i | 3,515 | 3,730 |
|---|---|---|
| Elongation, Percent | 230 | 370 |
| Hardness Shore "A" | 82 | 81 |
| Modulus 300%, p.s.i |  | 3,080 |

TABLE III—Continued
Air Oven Aged 70 Hrs. at 212° F.

| | | |
|---|---|---|
| Tensile, p.s.i | 3,860 | 3,680 |
| Elongation, percent | 160 | 250 |
| Hardness Shore "A" | 86 | 84 |

Compression Set Method "B"—70 Hrs. at 212° F.—Cure 45' at 325° F.

| | |
|---|---|
| Percent Set | 45.0  53.9 |

[1] Butadiene/acrylonitrile/sorbic acid copolymer, 55/30/15, 0.05 ephr.—COOH. Average Mooney viscosity, ML (1'+4') 212° F.=38.

The sorbic acid-containing test polymer was prepared by aqueous acid emulsion polymerization in accordance with the typical example given above, the polymerization being run to 65% monomer conversion.

The peroxide-containing stock gave much longer scorch times while maintaining approximately equal aged and unaged cured rubber properties. Again, the advantage of significantly lower compression set value is obtained with the peroxide-containing stock.

TABLE IV

| Recipe | A | B |
|---|---|---|
| Carboxylic Rubber [1] | 100 | 100 |
| Furnex (SRF Black) | 60 | 60 |
| Dibutyl Phthalate | 5 | 5 |
| Stearic Acid | 1 | 1 |
| Methyl Tuads | 3 | 3 |
| Altax | 3 | 3 |
| $ZnO_2$ | 5 | |
| ZnO #20 | | 5 |

Mooney Scorch 250° F.

| | | |
|---|---|---|
| Within 4 hours of mixing: | | |
| 5 point rise | 22 | 6 |
| 20 point rise | 48 | 15.5 |
| Lowest reading | 22 | 31 |
| After 7 days bin aging at room temp.: | | |
| 5 point rise | 21 | 7.5 |
| 20 point rise | 46 | 22 |
| Lowest reading | 24 | 40 |

Unaged Cured Properties—Cure 40' at 325° F.

| | | |
|---|---|---|
| Tensile, p.s.i | 3,120 | 2,810 |
| Elongation, percent | 320 | 520 |
| Hardness Shore "A" | 74 | 70 |
| Modulus 300%, p.s.i | 2,810 | 2,075 |

Air Oven Aged 70 Hrs. at 212° F.

| | | |
|---|---|---|
| Tensile, p.s.i | 3,215 | 3,105 |
| Elongation, percent | 310 | 440 |
| Hardness Shore "A" | 75 | 75 |

Compression Set "B" 70 Hrs. at 212° F.—Cure 45' at 325° F.

| | | |
|---|---|---|
| Percent Set | 31.9 | 36.6 |

[1] Butadiene, acrylonitrile, itaconic acid copolymer, 55/30/15, of 0.13 ephr.—COOH. Average Mooney viscosity, ML (1'+4') 212° F.=45.

The foregoing test data show that the peroxide provides the same advantageous result of much lower Mooney Scorch with cure systems where sulfur-generating curing agents are subsituted for elemental sulfur and where the acid of the polymer is polycarboxylic, e.g. itaconic. At the same time, the tensile properties of the unaged and aged cured stocks are comparable and a significant reduction in compression set is obtained with the peroxide-containing rubber mix.

TABLE V

| Recipe | A | B | C | D |
|---|---|---|---|---|
| Carboxylic rubber [1] | 100 | 100 | | |
| Carboxylic rubber [2] | | | 100 | 100 |
| Thermax (M.T. Black) | 50 | 50 | | |
| Statex R. (HAF Black) | 25 | 25 | 40 | 40 |
| Furnex (SRF Black) | | | 20 | 20 |
| Circolite Oil (Petroleum rubber process oil) | 7.5 | 7.5 | 10 | 10 |
| Stearic Acid | 1.5 | 1.5 | 1.5 | 1.5 |
| Sulfur | 2 | 2 | 2 | 2 |
| Altax | 1.5 | 1.5 | 1.75 | 1.75 |
| Thionex (secondary accelerator) | .15 | .15 | .20 | .20 |
| ZnO #20 | 5 | | 5 | |
| $ZnO_2$, 55% | | 5 | | 5 |

Mooney Scorch at 250° F.

| | | | | |
|---|---|---|---|---|
| Within 4 hours of mixing: | | | | |
| 5 point rise | 6.5 | 21 | 4 | 14 |
| 20 point rise | 9.5 | 36 | 5.5 | 22 |
| Lowest reading | 14 | 13 | 30 | 25 |
| After 7 days bin aging at room temp.: | | | | |
| 5 point rise | 5.5 | 25 | 2.5 | 13 |
| 20 point rise | 7.5 | 34 | 4.5 | 20.5 |
| Lowest reading | 13 | 12 | 41 | 25 |

TABLE V—Continued
Cured Properties—Cure, 40' M 325° F.

| | | | | |
|---|---|---|---|---|
| Tensile, p.s.i | 2,820 | 2,340 | 3,400 | 3,015 |
| Elongation, percent | 220 | 250 | 270 | 220 |
| Hardness Shore "A" | 93 | 91 | 80 | 79 |

[1] Butadiene/styrene/methacrylic acid copolymer, 63/27/10,0 .10 ephr.—COOH. Average Mooney viscosity, ML (1' + 4') 212° F. = 45.
[2] Butadiene/acrylic acid copolymer, 90/10, 0.057 ephr. —COOH. Average Mooney viscosity, ML (1' + 4') 212° F. = 59.

The results shown above in Table V demonstrate that the scorch resistance with the peroxide-containing stock is from 3 to 4 times greater than that of the zinc oxide-containing stock when tested within four hours of mixing. The stock aged seven days before test shows a scorch resistance about five times that of the stock without zinc peroxide. In these recipes a blend of different blacks was used and additional acceleration (Thionex) was provided in the curing system. These results indicate a very fast scorchy cure for the stocks without zinc peroxide. With the peroxide stocks, however, the much longer scorch time indicates ability to process these stocks safely both immediately after mixing and after an appreciable storage time.

In Table VI a non-black filler loading was employed and an organic peroxide vulcanizing agent (DiCup-dicumyl peroxide).

TABLE VI

| Recipe | A | B | C |
|---|---|---|---|
| Carboxylic rubber [1] | 100 | 100 | 100 |
| Calcene T—precipitated $CaCO_3$ | 40 | 40 | 40 |
| Hard Clay | 40 | 40 | 40 |
| Cumar P25 (cumarone-idene resin) | 10 | 10 | 10 |
| Stearic Acid | 1.5 | 1.5 | 1.5 |
| Sulfur | | .15 | |
| DiCup (dicumyl peroxide) | 1.5 | 1.5 | 1.5 |
| ZnO #20 | 5 | | |
| $ZnO_2$, 55% | | 5 | 5 |

Mooney Scorch at 250° F.

| | | | |
|---|---|---|---|
| Within 4 hours: | | | |
| 5 point rise | 13 | 12 | 14.5 |
| 20 point rise | 35 | 51 | 58 |
| Lowest reading | 28.5 | 29.5 | 30 |

Cured Properties—Cure 55' at 325° F.

| | | | |
|---|---|---|---|
| Tensile, p.s.i | 3,240 | 2,890 | 3,090 |
| Elongation, percent | 320 | 260 | 250 |
| Hardness Shore "A" | 89 | 90 | 91 |
| Modulus 300%, p.s.i | 2,990 | | |

Oven Aged—70 hours at 212° F.—Cure 40 Min.

| | | | |
|---|---|---|---|
| Tensile, p.s.i | 3,950 | 4,200 | 3,340 |
| Elongation, percent | 140 | 120 | 120 |
| Hardness Shore "A" | 94 | 94 | 93 |

Compression Set "B" 70 Hrs. at 212° F.—Cure 45 Min. at 325° F.

| | | | |
|---|---|---|---|
| Percent Set | 61.2 | 45.2 | 40.2 |

[1] Same as Table II recipes C and D.

These tests indicate that with an organic peroxide type cure, the zinc peroxide presents a definite advantage in scorch resistance, particularly at the 20 point rise level. Also, with this different type of cure system, a pronounced reduction in compression set is obtained just as in the case of sulfur type cures and the straight metallo-carboxylate cures.

TABLE VII

| Recipe | A | B | C | D | E |
|---|---|---|---|---|---|
| Carboxylic Rubber [1] | 100 | 100 | 100 | 100 | 100 |
| Furnex SRF Black | 40 | 40 | 40 | 40 | 40 |
| Dibutyl Phthalate | 5 | 5 | 5 | 5 | 5 |
| Stearic Acid | 1 | 1 | 1 | 1 | 1 |
| Sulfur | 1.5 | 1.5 | 1.5 | 1.5 | 1.5 |
| Altax | 1 | 1 | 1 | 1 | 1 |
| ZnO #20 | 5 | | | | |
| ZnO #20–21 | | 5 | | | |
| $ZnO_2$, 28% [2] | | | 5 | | |
| $ZnO_2$, 55% | | | | 5 | |
| $ZnO_2$, 70% | | | | | 5 |

TABLE VII—Continued

Mooney Scorch at 250° F.

| Within 4 hours: | | | | | |
|---|---|---|---|---|---|
| 5 point rise | 18.5 | 17.5 | 27 | 31 | 34 |
| 10 point rise | 24.5 | 24 | 37 | 44.5 | 46 |
| 20 point rise | 33 | 32 | 54 | 72 | 71 |
| Lowest reading | 27 | 27 | 25 | 26 | 27 |
| After 7 days bin aging at room temp.: | | | | | |
| 5 point rise | 14.5 | 15 | 25 | 29 | 32 |
| 10 point rise | 19 | 19.5 | 34 | 41 | 43.5 |
| 20 point rise | 25 | 25 | 46 | 63.5 | 63.5 |
| Lowest reading | 28 | 28 | 25 | 26 | 27 |
| After 30 days bin aging at room temp.: | | | | | |
| 5 point rise | 12 | 12 | 25 | 27 | 29 |
| 10 point rise | 15.5 | 15.5 | 32.5 | 39.5 | 40 |
| 20 point rise | 20 | 20 | 41.5 | 60 | 60 |
| Lowest reading | 27 | 28 | 24 | 25 | 25 |

Cured Properties

| | Cure, Min./° F. | | | | |
|---|---|---|---|---|---|
| | 40'/307° F. | | 40'/325° F. | | |
| Tensile, p.s.i | 4,260 | 4,105 | 4,210 | 3,840 | 3,740 |
| Elongation, percent | 310 | 310 | 270 | 300 | 330 |
| Hardness Shore "A" | 89 | 89 | 88 | 86 | 86 |
| Modulus 300%, p.s.i | 4,160 | 4,000 | ------ | 3,840 | 3,585 |

Oven Aged—70 Hrs. at 212° F—Cure 40 Min.

| Tensile, p.s.i | 4,000 | 4,200 | 4,375 | 4,150 | 4,055 |
|---|---|---|---|---|---|
| Elongation, percent | 180 | 210 | 170 | 200 | 220 |
| Hardness Shore "A" | 92 | 93 | 93 | 92 | 92 |

Compression Set "B" 70 Hrs. at 212° F—Cure 45 Min.

| Percent Set | 49.8 | 48.8 | 33.2 | 33.8 | 38.7 |
|---|---|---|---|---|---|

[1] Butadiene/acrylonitrile/methacrylic acid, 0.09 ephr. —COOH.
[2] Balance ZnO and Zn(OH)₂.

The foregoing table records results of tests on recipes having varying quantities of peroxide and compares such recipes with those without peroxide. Significantly higher Mooney Scorch resistance, and longer Mooney Scorch time, are obtained with relatively small amounts of peroxide. The 28% zinc peroxide-zinc oxide blend provides only 1.4 parts zinc peroxide per hundred parts or rubber. Increasing the quantity of zinc peroxide provides an additional measure of scorch resistance, but the difference between the 55% $ZnO_2$ blend and the 70% $ZnO_2$ blend is relatively small. These data indicate the peroxide may be only a minor fraction of the total polyvalent metal charge.

The compression set properties were fairly comparable throughout the entire range of peroxide content in the foregoing test recipes and are greatly improved over the stocks containing no peroxide.

In Table VIII below are shown test results in which the quantities of zinc oxide and zinc peroxide were widely varied while still obtaining the benefits of the invention.

TABLE VIII

| Recipe | A | B | C | D | E |
|---|---|---|---|---|---|
| Carboxylic Rubber | 100 | 100 | 100 | 100 | 100 |
| Furnex (SRF Black) | 40 | 40 | 40 | 40 | 40 |
| Dibutyl Phthalate | 5 | 5 | 5 | 5 | 5 |
| Stearic Acid | 1 | 1 | ----- | 1 | 1 |
| Sulfur | 1.5 | 1.5 | 1.5 | ----- | ----- |
| Altax | 1 | 1 | 1 | ----- | ----- |
| ZnO #20 | 2 | 3.5 | ----- | 7.5 | ----- |
| ZnO₂, 55% | 1.5 | 1.5 | ----- | ----- | 7.5 |
| Kadox 72 [2] | ----- | ----- | 5 | ----- | ----- |

Mooney Scorch at 250° F.

| Within 4 hours: | | | | | |
|---|---|---|---|---|---|
| 5 point rise | 26 | 21 | 16 | 11 | 27 |
| 30 point rise | 60 | 44 | 34 | 30 | ([3]) |
| Low reading | 19 | 20 | 20 | 23 | 20 |

Compression Set Method "B" 70 Hours at 212° F.—Cure 45' at 325° F.

| Percent Set | 40.2 | 36.7 | 45.7 | 99.1 | 86.6 |
|---|---|---|---|---|---|

[1] Budadiene/acrylonitrile/methacrylic acid copolymer 0.09 ephr.—COOH.
[2] Rubber grade ZnO—New Jersey zinc.
[3] 14 pts. in 90'.

In the foregoing tests the peroxide content varied from about 0.8 up to over 4 parts. The total polyvalent metal charge varied from about 3.5 to 7.5 parts, which based on the carboxyl content of the polymer represents a variation of from just under stoichiometric amount to over twice theoretical.

As may be seen from the Mooney Scorch values, the peroxide substantially reduces the scorch tendency in all cases, whether the cure system consists solely of polyvalent metal cross-linking agent or also includes sulfur cure system. It should be noted that the Mooney Scorch value of stock C compounded with the sulfur cure system is comparable to that of recipe F containing only polyvalent metal. This clearly indicates that the scorchiness or precure tendency in these stocks is due to the rapid ionic reaction between the polyvalent metal and the carboxyl groups and cannot be attributed to the slower reactions of the sulfur cure.

The data presented in Table IX below illustrate application of the invention to other polyvalent metals in straight metallo-carboxylate cures without sulfur.

TABLE IX

| Recipe | A | B | C | D | E | F |
|---|---|---|---|---|---|---|
| Carboxylic Rubber [1] | 100 | 100 | 100 | 100 | 100 | 100 |
| Furnex SRF (Black) | 40 | 40 | 40 | 40 | 40 | 40 |
| Dibutyl Phthalate | 5 | 5 | 5 | 5 | 5 | 5 |
| Stearic Acid | 1 | 1 | 1 | 1 | 1 | 1 |
| ZnO #20 | 5 | ----- | ----- | ----- | ----- | ----- |
| ZnO₂ (55%)[2] | ----- | 5 | ----- | ----- | ----- | ----- |
| Ca(OH)₂ | ----- | ----- | 5 | ----- | ----- | ----- |
| CaO₂ (60%)[3] | ----- | ----- | ----- | 5 | ----- | ----- |
| MgO (Mag D) | ----- | ----- | ----- | ----- | 5 | ----- |
| MgO₂ (50%)[4] | ----- | ----- | ----- | ----- | ----- | 5 |

Mooney Scorch at 250° F.

| Within 4 hours: | | | | | | |
|---|---|---|---|---|---|---|
| 5 point rise | 12' | 22' | 8' | 20' | 7' | 21' |
| 20 point rise | 26' | 100' | 21' | 44' | 11' | 11 |
| Low reading | 17' | 17' | 16' | 16' | 21' | 16' |
| After 7 days at room temp.: | | | | | | |
| 5 point rise | 8.5' | 21' | 8' | 18' | 5' | 22' |
| 20 point rise | 14' | 82' | 18' | 33' | 6.5' | 99' |
| Low reading | 19' | 16' | 21' | 19' | 25' | 17' |

Cured Properties

Compression Set "B" 70/212°—(Cure 60/307)

| Percent Set | 100 | 68.3 | 105.2 | 87.1 | 100.4 | 97.9 |
|---|---|---|---|---|---|---|

"B" Fuel 70/RT—(Cure 60/307)

| Volume Change | 30.8 | 29.3 | 29.0 | 26.6 | 27.9 | 30.4 |
|---|---|---|---|---|---|---|

[1] Butadiene/acrylonitrile/methacrylic acid copolymer, 0.09 ephr. —COOH.
[2] Balance ZnO+Zn(OH)₂.
[3] Balance CaO+Ca(OH)₂.
[4] Balance MgO+Mg(OH)₂.

In stocks D and F the calcium and magnesium peroxides provide Mooney Scorch values which are reduced by a factor of two to four fold compared to stocks C and E without peroxide. In addition, although the compression set values of these stocks cured without sulfur are high, in each case those stocks cured with the peroxide exhibit significant improvement in compression set.

The presence of peroxide in the carboxylic polymer provides a further advantage in the improved ozone resistance of the cured stock. This is shown in the Table X below illustrating outdoor aging tests using samples with triangular shaped cross section, the tests being conducted as prescribed in ASTM Aging Test D 1171–61. Recipes A and B of Table IX above were used in these tests with variations in the stock shown below in the table. The compounded rubber was cured for sixty minutes at 307° F. and then after cool down was subjected to the outdoor aging test with the results as recorded below.

TABLE X

[Outdoor Aging ASTM Test Method D 1171–61]

| Recipe | Rating and Date (1963) | | | | |
|---|---|---|---|---|---|
| | 3/26 | 3/27 | 4/11 | 5/7 | 6/10 |
| Recipe A of Table IX (ZnO) | 0 | 0 | 0 | 1 | 3 |
| Recipe A of Table IX (ZnO+3 parts Antichek Wax) | 0 | 0 | 0 | 1 | 3 |
| Recipe B of Table IX (ZnO₂) | 0 | 0 | 0 | 0 | 2 |

After six weeks of exposure the cured polymers containing no peroxide gave definite signs of ozone cracking, including the sample with three parts of a wax (Sun Antichek) which is intended to protect the rubber against ozone deterioration. During this same period the cured stock containing the zinc peroxide showed no evidence of ozone cracking. It was not until 8 to 10 weeks exposure that the zinc peroxide-containing stock showed signs of initial ozone cracking and by that time the other test stocks were badly cracked.

Although the curing temperatures in the tests tabulated above are generally 300° F. or higher, it is to be understood that the metallo-carboxylate cure may be conducted at much lower temperatures if sufficient time is allowed for development of a proper cure. Curing temperatures of from 125° F. to 400° F. may be used.

The invention is applicable to any carboxylated polymer which is vulcanizable or curable with polyvalent metal oxide, including carboxylated natural rubber. Such polymers include those mentioned in U.S. Patent 2,662,874 all of which are copolymers of aliphatic conjugated dienes such as butadiene-1,3 and derivatives, preferably having 4 to 6 carbon atoms. In addition to aqueous emulsion polymerization, such carboxylated copolymers may be made by the other methods such as disclosed in the above-mentioned patent. Of course, where it is desired, the carboxylated rubber may be blended with non-carboxylic stocks in which case sulfur or organic peroxide curatives must be used.

The invention is furthermore fully applicable to carboxyl-containing acrylate polymers and other carboxylated polymers made from monoethylenically unsaturated monomers only, where such polymers are curable to elastomeric form by reaction of polyvalent metal cross-linking agents with the carboxyl groups.

For the majority of applications of the dry rubber compounds to which the present invention pertains, carboxylated butadiene copolymers are preferred in which the diene content of the polymer is at least about 40%, preferably at least 50% for developing the most desirable elastomeric properties.

Any of the monoethylenically unsaturated monomers copolymerizable with butadiene may be used for the preparation of ter and multipolymers of the carboxylic type. Alkenyl aromatic monomers, such as styrene and aliphatic nitriles such as acrylonitrile are preferred comonomers, although any others such as vinyl pyridine and acrylic acid esters may be mentioned as suitable. When such comonomers are used, they may be present in widely varying ranges from about 1% up to about 50% by weight.

The invention, as shown by the foregoing description and test results, contributes an improved cure system for carboxylic rubber which overcomes the precure or scorch tendencies of these polymers when mixed with polyvalent metal curatives. This insures safer processing before cure and avoids scrapping of stock or production of defective products. At the same time the cured stock physical properties are enhanced or maintained at high levels.

Numerous modifications and additions to the specific embodiments illustrated above will be apparent to those skilled in the art. Such changes may be made without departing from the scope of the invention which is to be determined by the appended claims.

I claim:

1. A carboxylic rubber mix capable of being cured by heating comprising a carboxylic rubbery copolymer and a curing system for preventing precure of said copolymer prior to curing by heat, said system containing a polyvalent metal curing agent reactable with carboxyl groups of the copolymer, at least one-fourth of which is present as a peroxide.

2. A rubber mix according to claim 1 in which said curing system also contains a curing agent other than said polyvalent metal curing agent.

3. A rubber mix according to claim 2 in which the other curing agent is sulfur and the curing system also contains an organic cure accelerator.

4. A rubber mix according to claim 1 in which the other curing agent is an organic peroxide.

5. A rubber mix according to claim 1 in which the polyvalent metal portion of the curing agent is a metal of Group II of the Periodic Table.

6. A rubber mix according to claim 1 in which the metal present as the peroxide is selected from the group consisting of calcium, magnesium, zinc and mixtures thereof.

7. A rubber mix according to claim 6 in which said copolymer is a diene copolymer having a carboxyl (COOH)

content of from about .02 to about 0.5 ephr. and said curing system contains at least about 0.5 part of the polyvalent metal peroxide per 100 parts of the copolymer based on 1 to 2 parts of the polyvalent metal curing agent per 100 parts of the rubbery copolymer.

8. A rubber mix according to claim 6 in which said copolymer is a diene copolymer having a diene content of at least about 40% by weight and a carboxyl (COOH) content of from about .02 to about 0.5 ephr. and said curing system contains a polyvalent metal curing agent, at least about one-fourth of which is zinc peroxide, in an amount not less than about one-half and not substantially in excess of twice the stoichiometric amount with respect to the carboxyl (COOH) group content of the copolymer.

9. A carboxylic rubber having improved scorch resistance and improved compression set characteristics when cured comprising a rubbery copolymer containing at least about 40% by weight of a polymerized aliphatic conjugated diolefin, from about 1 to about 50% by weight of a copolymerized monoethylenically unsaturated monomer and the balance being up to about 40% by weight of a copolymerized aliphatically unsaturated carboxylic acid, said copolymer having a carboxyl (COOH) group content of from about .02 to about 0.5 ephr. and being cured by heating to a temperature of from about 125° F. to about 400° F. with a curing system containing a polyvalent metal curing agent in an amount not less than about one-half and not substantially exceeding twice the stoichiometric amount with respect to the carboxyl (COOH) group content of the copolymer and at least about one-fourth of the polyvalent metal curing agent being present as a peroxide, said copolymer exhibiting a substantially reduced compression set compared to polymers cured by said system in the absence of said polyvalent metal peroxide.

10. A carboxylic rubber according to claim 9 in which the polyvalent metal present as a peroxide is selected from the group consisting of calcium, magnesium, zinc and mixtures thereof.

11. The carboxylic rubber according to claim 9 in which the curing system also contains a polyvalent metal curing agent present in the form of a compound selected from the group consisting of oxides, hydroxides and mixtures thereof.

References Cited

UNITED STATES PATENTS

| 2,669,550 | 2/1954 | Brown | 260—80.7 |
| 2,724,707 | 11/1955 | Brown | 260—80.7 |
| 2,849,426 | 8/1958 | Miller | 260—80.7 |
| 3,093,620 | 6/1963 | Gladding. | |

OTHER REFERENCES

Zapp et al., J. Pol. Sci., 9, 97–113 (1952).

JOSEPH L. SCHOFER, *Primary Examiner.*

J. C. HAIGHT, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,136            September 24, 1968

John C. Baker, Jr.

It is certified that error appears in the above identified patent and that said Letters Patent are hereby corrected as shown below:

Column 3, line 3, "stiochiometric" should read -- stoichiometric --. Column 8, TABLE V-Continued, in the heading, line 1 thereof, "40′M 325° F." should read -- 40′ at 325° F. --; same column 8, TABLE VI, second column, line 28 thereof, "61.2" should read -- 61.6 --. Column 9, TABLE VIII, first column, line 1 thereof, "Carboxylic Rubber" should read -- Carboxylic Rubber[1] --.

Signed and sealed this 17th day of February 1970.

(SEAL)
Attest:

Edward M. Fletcher, Jr.          WILLIAM E. SCHUYLER, JR.

Attesting Officer               Commissioner of Patents